(12) United States Patent
Toews

(10) Patent No.: US 10,616,241 B2
(45) Date of Patent: Apr. 7, 2020

(54) SYSTEMS AND METHODS FOR PERFORMING EXTERNAL DATA VALIDATION FOR AIRCRAFT ONBOARD SYSTEMS

(71) Applicant: HONEYWELL INTERNATIONAL INC., Morris Plains, NJ (US)

(72) Inventor: Phillip J. Toews, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 239 days.

(21) Appl. No.: 15/613,682

(22) Filed: Jun. 5, 2017

(65) Prior Publication Data
US 2018/0351966 A1 Dec. 6, 2018

(51) Int. Cl.
| | |
|---|---|
| H04L 29/06 | (2006.01) |
| G06F 21/44 | (2013.01) |
| B64D 45/00 | (2006.01) |
| G06F 11/16 | (2006.01) |
| G06F 11/00 | (2006.01) |
| G06F 11/07 | (2006.01) |

(52) U.S. Cl.
CPC ............ *H04L 63/123* (2013.01); *B64D 45/00* (2013.01); *G06F 11/004* (2013.01); *G06F 11/0796* (2013.01); *G06F 11/16* (2013.01); *G06F 11/1654* (2013.01); *G06F 21/44* (2013.01); *B64D 2045/0075* (2013.01)

(58) Field of Classification Search
CPC .... H04L 63/123; G06F 11/1654; G06F 11/16; G06F 11/0796; G06F 11/004; G06F 21/44; B64D 45/00; B64D 2045/0075
See application file for complete search history.

(56) References Cited

U.S. PATENT DOCUMENTS

| | | | |
|---|---|---|---|
| 4,943,919 A | 7/1990 | Aslin et al. | |
| 5,260,874 A | 11/1993 | Berner et al. | |
| 6,317,659 B1 | 11/2001 | Lindsley et al. | |
| 6,319,008 B1 | 11/2001 | Mickelson et al. | |
| 7,200,626 B1 | 4/2007 | Hoang et al. | |
| 8,165,136 B1 * | 4/2012 | Sharma ............... | H04L 12/4641 370/235 |
| 8,373,872 B2 | 2/2013 | Lankreijer et al. | |

(Continued)

FOREIGN PATENT DOCUMENTS

| | | |
|---|---|---|
| EP | 0144226 A2 | 12/1985 |
| GB | 2148135 A | 5/1985 |

OTHER PUBLICATIONS

Extended EP Search Report for Application No. 18173933.5 dated Oct. 15, 2018.

*Primary Examiner* — David Garcia Cervetti
(74) *Attorney, Agent, or Firm* — Lorenz & Kopf, LLP

(57) ABSTRACT

A method for validating incoming data to a computer system is provided. The method receives the incoming data, simultaneously, by the computer system and a mirror computer system, wherein the computer system is separate and distinct from the mirror computer system, wherein the computer system lacks a communication connection to the mirror computer system, and wherein the mirror computer system lacks a communication connection to the computer system; processes the incoming data by the mirror computer system, to produce output; and when the output comprises an acceptable result, processes the incoming data by the computer system.

12 Claims, 6 Drawing Sheets

(56) References Cited

U.S. PATENT DOCUMENTS

| | | | | |
|---|---|---|---|---|
| 8,539,582 B1* | 9/2013 | Aziz | G06F 21/554 | 713/150 |
| 8,566,946 B1* | 10/2013 | Aziz | G06F 21/554 | 726/25 |
| 8,850,571 B2* | 9/2014 | Staniford | H04L 63/1416 | 713/187 |
| 8,881,282 B1* | 11/2014 | Aziz | G06F 21/554 | 726/24 |
| 8,893,278 B1* | 11/2014 | Chechik | H04L 63/145 | 713/188 |
| 8,898,788 B1* | 11/2014 | Aziz | G06F 21/00 | 726/24 |
| 9,530,318 B1* | 12/2016 | Turner | G08G 5/0021 | |
| 9,703,476 B1* | 7/2017 | Pappas | G06F 3/04847 | |
| 9,719,799 B2* | 8/2017 | Pandit | G01C 23/00 | |
| 9,811,665 B1* | 11/2017 | Xu | G06F 21/562 | |
| 9,858,823 B1* | 1/2018 | Lynn | G08G 5/0034 | |
| 9,954,967 B1* | 4/2018 | Gheorghe | H04L 67/28 | |
| 10,084,806 B2* | 9/2018 | Ward | H04L 63/1433 | |
| 10,192,052 B1* | 1/2019 | Singh | G06F 21/562 | |
| 2007/0250930 A1* | 10/2007 | Aziz | G06F 21/554 | 726/24 |
| 2008/0005782 A1* | 1/2008 | Aziz | G06F 9/45537 | 726/3 |
| 2009/0112464 A1* | 4/2009 | Belcher | G01C 21/165 | 701/414 |
| 2009/0138871 A1* | 5/2009 | Kimberly | G06F 8/61 | 717/173 |
| 2010/0312420 A1* | 12/2010 | Sham | G06Q 10/00 | 701/3 |
| 2010/0332054 A1* | 12/2010 | Brandao | G08G 5/0013 | 701/3 |
| 2011/0087428 A1* | 4/2011 | Barnetche | G01C 23/00 | 701/532 |
| 2012/0304017 A1 | 11/2012 | Martin | | |
| 2012/0331553 A1* | 12/2012 | Aziz | G06F 21/554 | 726/23 |
| 2013/0132548 A1* | 5/2013 | Cabos | H04L 67/16 | 709/223 |
| 2013/0227566 A1* | 8/2013 | Higuchi | G06F 9/45533 | 718/1 |
| 2013/0227691 A1* | 8/2013 | Aziz | H04L 63/145 | 726/24 |
| 2014/0097972 A1* | 4/2014 | Barraci | G01C 23/005 | 340/971 |
| 2014/0180507 A1* | 6/2014 | Geay | G01C 23/00 | 701/3 |
| 2015/0096022 A1* | 4/2015 | Vincent | G06F 21/566 | 726/23 |
| 2015/0096024 A1* | 4/2015 | Haq | H04L 63/145 | 726/23 |
| 2015/0096025 A1* | 4/2015 | Ismael | G06F 21/566 | 726/23 |
| 2015/0150095 A1* | 5/2015 | Mere | G05D 1/00 | 726/4 |
| 2015/0186641 A1* | 7/2015 | Cabrera | G06F 21/554 | 726/23 |
| 2015/0215327 A1* | 7/2015 | Cabrera | H04L 63/1416 | 726/23 |
| 2015/0222647 A1* | 8/2015 | Lietz | H04L 63/1416 | 726/23 |
| 2015/0222653 A1* | 8/2015 | Cabrera | H04L 63/1416 | 726/23 |
| 2015/0323933 A1* | 11/2015 | Darbois | G05D 1/0202 | 701/4 |
| 2015/0327307 A1* | 11/2015 | Randrianasolo | H04W 12/04 | 370/329 |
| 2015/0338237 A1* | 11/2015 | Bonamy | G01C 23/005 | 340/973 |
| 2016/0019793 A1* | 1/2016 | Fournier | B64D 45/00 | 701/400 |
| 2016/0078770 A1* | 3/2016 | Coulmeau | G08G 5/0039 | 701/3 |
| 2016/0093223 A1* | 3/2016 | Caudron | B64D 45/00 | 701/3 |
| 2016/0110211 A1* | 4/2016 | Karnes | H04L 43/12 | 718/1 |
| 2016/0125742 A1* | 5/2016 | Shorter, Jr. | G08G 5/0026 | 701/528 |
| 2016/0182336 A1* | 6/2016 | Doctor | H04L 43/062 | 709/224 |
| 2016/0191210 A1* | 6/2016 | Hirano | G06F 13/00 | 714/748 |
| 2016/0269437 A1* | 9/2016 | McDougal | H04L 63/1433 | |
| 2016/0300551 A1* | 10/2016 | Branthomme | G09G 5/363 | |
| 2016/0308885 A1* | 10/2016 | McDougal | H04L 63/0281 | |
| 2016/0328978 A1* | 11/2016 | Ramaker | G01C 21/20 | |
| 2016/0350683 A1* | 12/2016 | Bester | G06Q 10/0633 | |
| 2017/0046962 A1* | 2/2017 | Shipley | G08G 5/0091 | |
| 2017/0054709 A1* | 2/2017 | Benjamin | H04L 63/1408 | |
| 2017/0187539 A1* | 6/2017 | Thompson | H04W 12/08 | |
| 2017/0237756 A1* | 8/2017 | Lietz | H04L 63/14 | 726/23 |
| 2017/0241798 A1* | 8/2017 | Van Den Bergh | B64F 5/60 | |
| 2017/0251501 A1* | 8/2017 | Batsakes | H04L 67/12 | |
| 2017/0291723 A1* | 10/2017 | Reddy | B64D 45/00 | |
| 2017/0343357 A1* | 11/2017 | Mere | B64D 45/00 | |
| 2017/0365177 A1* | 12/2017 | Puentes | B64D 43/00 | |
| 2018/0006923 A1* | 1/2018 | Gao | H04L 43/062 | |
| 2018/0044034 A1* | 2/2018 | Newman | B64D 45/00 | |
| 2018/0075758 A1* | 3/2018 | Martinez | G05D 1/101 | |
| 2018/0225976 A1* | 8/2018 | Rinehart | G06N 7/005 | |
| 2018/0268144 A1* | 9/2018 | Warpinski | G06F 21/6236 | |
| 2018/0365265 A1* | 12/2018 | Blanc | B64D 43/00 | |
| 2018/0366008 A1* | 12/2018 | Dacre-Wright | G08G 5/0021 | |

* cited by examiner

SYSTEMS AND METHODS FOR PERFORMING EXTERNAL DATA VALIDATION FOR AIRCRAFT ONBOARD SYSTEMS

TECHNICAL FIELD

Embodiments of the subject matter described herein relate generally to performing testing to verify the integrity of data received by a secure computer system. More particularly, embodiments of the subject matter relate to the use of a mirror or simulator computer system to perform external data validation prior to use.

BACKGROUND

Secure computer systems may be used in applications requiring a high degree of accuracy. A secure computer system may require data validation for any incoming data, in order to safeguard the integrity of the secure computer system. The integrity of incoming data ensures that the secure computer system and any peripheral devices or software are not corrupted or otherwise subject to erroneous or malicious data transmissions. To perform normal operations, certain secure computer systems may require the use of data imported from computing devices and systems external to the secure computer system. Using such "off-board" data presents a risk of introducing corrupt or erroneous data into a secure computing environment.

Accordingly, it is desirable to provide a method for validating data before importing that data into a secure computer system. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for validating incoming data to a computer system. The method receives the incoming data, simultaneously, by the computer system and a mirror computer system, wherein the computer system is separate and distinct from the mirror computer system, wherein the computer system lacks a communication connection to the mirror computer system, and wherein the mirror computer system lacks a communication connection to the computer system; processes the incoming data by the mirror computer system, to produce output; and when the output comprises an acceptable result, the method processes the incoming data by the computer system.

Some embodiments of the present disclosure provide a system for validating incoming data. The system includes a mirror computer system and a primary computer system. The mirror computer system includes: a mirror memory element; a mirror display device, configured to simulate a primary display device; a mirror communication device, configured to receive a first instance of incoming data at a particular time; and a mirror processor, communicatively coupled to the mirror memory element, the mirror display device, and the mirror communication device, the mirror processor configured to: process the first instance of the incoming data, when received via the mirror communication device; and present output via the mirror display device, based on processing the first instance of the incoming data, wherein the output comprises one of acceptable results and unacceptable results. The primary computer system, includes: a primary memory element; a primary communication device, configured to receive a second instance of the incoming data at the particular time; and a primary processor, communicatively coupled to the primary memory element and the primary communication device, the primary processor configured to process the second instance of the incoming data, when the output comprises acceptable results.

Some embodiments of the present disclosure provide a method for receiving and processing incoming data by a system comprising at least a primary computer system and a mirror computer system. The method obtains a duplicate of software associated with the primary computer system, by the mirror computer system; receives the incoming data, simultaneously, by the primary computer system and a mirror computer system, wherein the primary computer system is separate and distinct from the mirror computer system, wherein the primary computer system lacks a communication connection to the mirror computer system, and wherein the mirror computer system lacks a communication connection to the primary computer system; processes the incoming data by executing the duplicate, by the mirror computer system, to produce output, wherein execution of the duplicate results in a simulation of operation of the primary computer system; and when the output comprises an acceptable result, the method processes the incoming data by the primary computer system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for performing testing and verification to ensure integrity of incoming data to a primary computer system using a "mirror" computer system. Exemplary embodiments of the systems and methods described herein may be associated with vehicle applications, and more specifically, with aviation applications onboard an aircraft which require rigorous testing and potential certification to provide certainty of the accuracy of incoming data.

Figure 1:
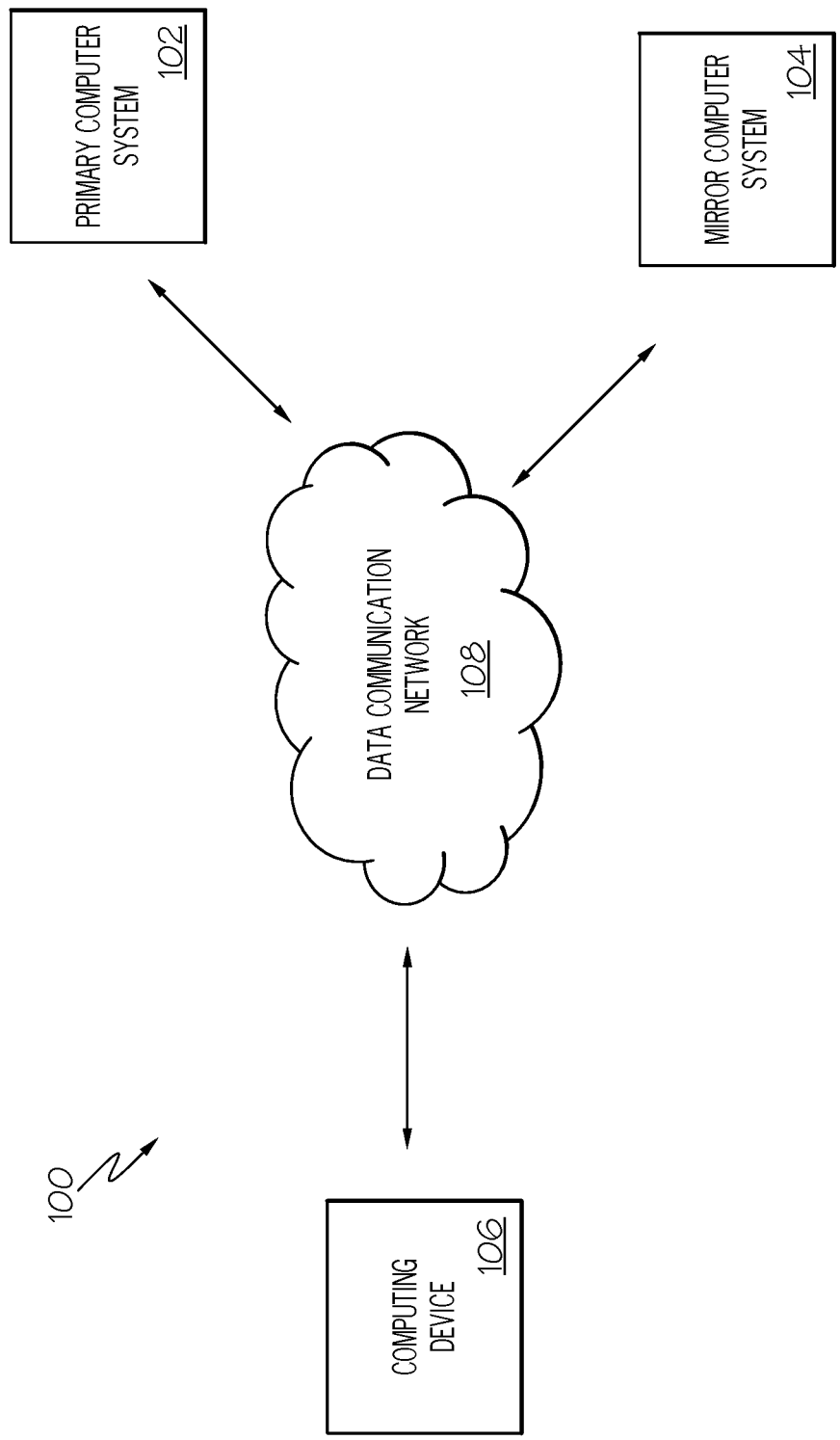
FIG. 1 is a diagram of a system for validating incoming data, in accordance with the disclosed embodiments.

Turning now to the figures, FIG. 1 is a diagram of a system 100 for validating incoming data, in accordance with the disclosed embodiments. The system 100 operates to validate data transmitted to a primary computer system 102, prior to incorporation and use by the primary computer system 102. The system 100 may include, without limitation, a computing device 106 that communicates with the primary computer system 102 and a mirror computer system 104, via a data communication network 108. In practice, certain embodiments of the system 100 may include additional or alternative elements and components, as desired for the particular application.

The computing device 106 may be implemented by any computing device that includes at least one processor, some form of memory hardware, a user interface, and communication hardware. For example, the computing device 106 may be implemented using a personal computing device, such as a tablet computer, a laptop computer, a personal digital assistant (PDA), a smartphone, or the like. In certain embodiments, the system 100 is implemented onboard a vehicle, which may be implemented as any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like. In this scenario, the computing device 106 is configured to process and transmit data applicable to the particular vehicle for which the computing device 106 processes data. For example, the computing device 106 is capable of storing, maintaining, and executing an Electronic Flight Bag (EFB) application that processes data applicable to aviation applications. As another example, the computing device 106 may be implemented using an integrated computer system onboard an aircraft, which is configured to process data applicable to one or more systems of the particular aircraft.

In other embodiments, the computing device 106 may be implemented as any computer communicatively coupled to, and using a communication protocol compatible with, the primary computer system 102 and the mirror computer system 104. The computing device 106 communicates with the primary computer system 102 and the mirror computer system 104 using one or more wired and/or wireless communication connections via the data communication network 108. The computing device 106 may be located in close proximity to the primary computer system 102 and the mirror computer system 104, or the computing device 106 and the primary computer system 102 and the mirror computer system 104 may be disparately located.

The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The computing device 106 has stored, received, generated, or otherwise obtained a set of data associated with one or more applications of the primary computer system 102. Here, the set of data is external to the primary computer system 102 and is required by the primary computer system 102 to perform functionality of the one or more associated applications. However, because the set of data is external to the primary computer system 102, the external set of data may or may not be uncorrupted and safe to import into the primary computer system 102. Thus, the external set of data must be validated before use by the primary computer system 102.

During typical operation, the computing device 106 simultaneously transmits the set of data to the primary computer system 102 and the mirror computer system 104. The primary computer system 102 retains the set of data in a data buffer, and the mirror computer system 104 acts as a simulated version of the primary computer system 102 by executing a duplicate of a software application associated with functionality of the primary computer system 102 and using the received set of external data to perform the functionality of the primary computer system 102. The mirror computer system 104 produces an output result that is presented to a user via a display device configured to simulate a display of the primary computer system 102, such that a user may evaluate the output result and determine whether the output is appropriate, indicating that the set of external data is uncorrupted and safe to import into the primary computer system 102 for use. When the user provides a user input selection to the primary computer system 102, wherein the selection indicates that the set of external data is safe for use, then the primary computer system 102 extracts the set of external data from the data buffer, imports the set of external data, and performs functionality using the set of external data.

Exemplary embodiments of the invention may be used for aviation applications onboard an aircraft. For example, the primary computer system 102 may be implemented as a Flight Management System (FMS) or other avionics device requiring certification to verify the integrity of the any imported data. In this example, the mirror computer system 104 may be implemented as any computer system or avionics device onboard the aircraft that lacks a communication connection to the primary computer system 102 (e.g., the FMS). Thus, the primary computer system 102 and the mirror computer system 104 are separate and distinct computing entities, and the primary computer system 102 is unable to receive the set of external data (or any other data) from the mirror computer system 104. In this example, the set of external data may be received from a personal computing device executing an Electronic Flight Bag (EFB) application, from a ground control computer system, or from any other computer system with a hardwired or wireless communication connection to the primary computer system 102 and the mirror computer system 104, wherein a first communication connection from the computing device 106 to the primary computer system 102 is separate and distinct from a second communication connection from the computing device 106 to the mirror computer system 104.

Figure 2:
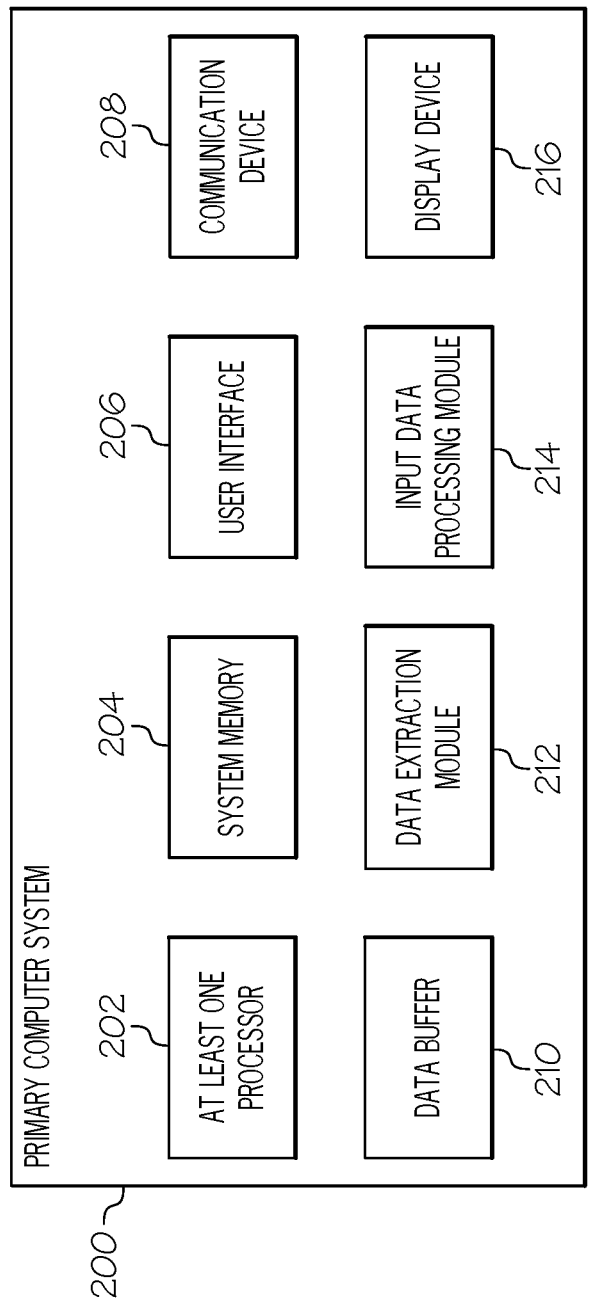
FIG. 2 is a functional block diagram of a primary computer system, in accordance with the disclosed embodiments.

FIG. 2 is a functional block diagram of a primary computer system 200, in accordance with the disclosed embodiments. It should be noted that the primary computer system 200 can be implemented with the primary computer system 102 depicted in FIG. 1. In this regard, the primary computer system 200 shows certain elements and components of the primary computer system 102 in more detail.

The primary computer system 200 generally includes, without limitation: at least one processor 202; system memory 204; a user interface 206; a communication device 208; a data buffer 210; a data extraction module 212; an input data processing module 214; and a display device 216. These elements and features of the primary computer system 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the primary computer system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with functionality of the primary computer system 200, and graphical elements associated with the primary computer system 200. The system memory 204 may be realized using any number of devices, components, or modules, as appropriate to the embodiment. Moreover, the primary computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the primary computer system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the primary computer system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the primary computer system 200. For example, the user interface 206 could be manipulated by an operator to provide a user input indication that an output result presented by a mirror computer system (external to the primary computer system 200) is either correct or incorrect, expected or unexpected, acceptable or unacceptable, and thus the primary computer system 200 should or should not import and use a set of data received by the communication device 208 and stored in the data buffer 210, as described herein.

In certain embodiments, the user interface 206 may include or cooperate with various features to allow a user to interact with the primary computer system 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The communication device 208 is suitably configured to communicate data between the primary computer system 200 and one or more external computing devices or computer systems (e.g., reference 106, FIG. 1). The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: a set of data from an external source, indications that a received set of external data is approved or not approved for import and use during execution of functionality associated with the primary computer system 200, and other data compatible with the primary computer system 200. Data provided by the primary computer system 200 may include, without limitation, an acknowledgment that a set of data from an external source has been received, results generated by the execution of functionality associated with the primary computer system 200 using the set of data from an external source, and the like.

The data buffer is configured to receive a set of data from an external source (e.g., reference 106, FIG. 1; reference 400, FIG. 4), and to retain or hold the set of data until it is determined that the data is uncorrupted and safe to import for use by the primary computer system 102. The data buffer 210 is a region of a physical memory storage used to temporarily store a set of data received from a source external to the primary computer system 200. The data buffer 210 may be implemented in a fixed memory location in hardware, by using a virtual data buffer in software that points to a location in the physical memory, or the like.

The data extraction module 212 is configured to extract a set of data from the data buffer 210, wherein the set of data has been received from an external source and retained in the data buffer 210 pending authorization to use the data by the primary computer system 200. In some embodiments, the primary computer system 200 receives a user input selection to release the set of external data from the data buffer 210 and, in response, the data extraction module 212 removes the set of data from the data buffer 210 for use by the primary computer system 200. However, in other embodiments, the data extraction module 212 may receive other indications that the set of data is authorized for use, which may include voice commands, user gestures, or the like.

The input data processing module 214 is configured to process a set of data that has been extracted from the data buffer 210 (by the data extraction module 212) to perform functionality associated with the primary computer system 200. For example, the extracted set of data may include user input parameters, commands, selections, or data entry values applicable to a particular application of the primary computer system 200. In this case, the input data processing module 214 provides the commands, selections, or data entry values to the particular application to produce user-requested results and/or to perform a user-requested operation. In certain embodiments, the primary computer system 200 is implemented as an avionics device onboard an aircraft, such as a Flight Management System (FMS). In this case, the input data processing module 214 uses a set of user input FMS parameters, such as that provided via an Electronic Flight Bag (EFB) application, to provide takeoff and landing data (i.e., TOLD data), vertically optimized flight plan to be flown by the FMS, or optimized speeds to be used by the FMS.

In practice, the data buffer 210, the data extraction module 212, and/or the input data processing module 214 may be implemented with (or cooperate with) the at least one processor 202 to perform at least some of the functions and operations described in more detail herein. In this regard, the data buffer 210, the data extraction module 212, and/or the input data processing module 214 may be realized as suitably written processing logic, application program code, or the like.

The display device 216 is configured to display various icons, text, and/or graphical elements associated with receiving user input approval or disapproval of the import and use of a set of data received via the communication device 208 and stored in the data buffer 210, the functionality of the primary computer system 200, or the like. In an exemplary embodiment, the display device 216 and the user interface 206 are communicatively coupled to the at least one processor 202. The at least one processor 202, the user interface 206, and the display device 216 are cooperatively configured to display, render, or otherwise convey one or more graphical representations or images associated with the primary computer system 200 on the display device 216, as described in greater detail below. In an exemplary embodiment, the display device 216 is realized as an electronic display configured to graphically display primary computer system 200 data, as described herein. In some embodiments, the primary computer system 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
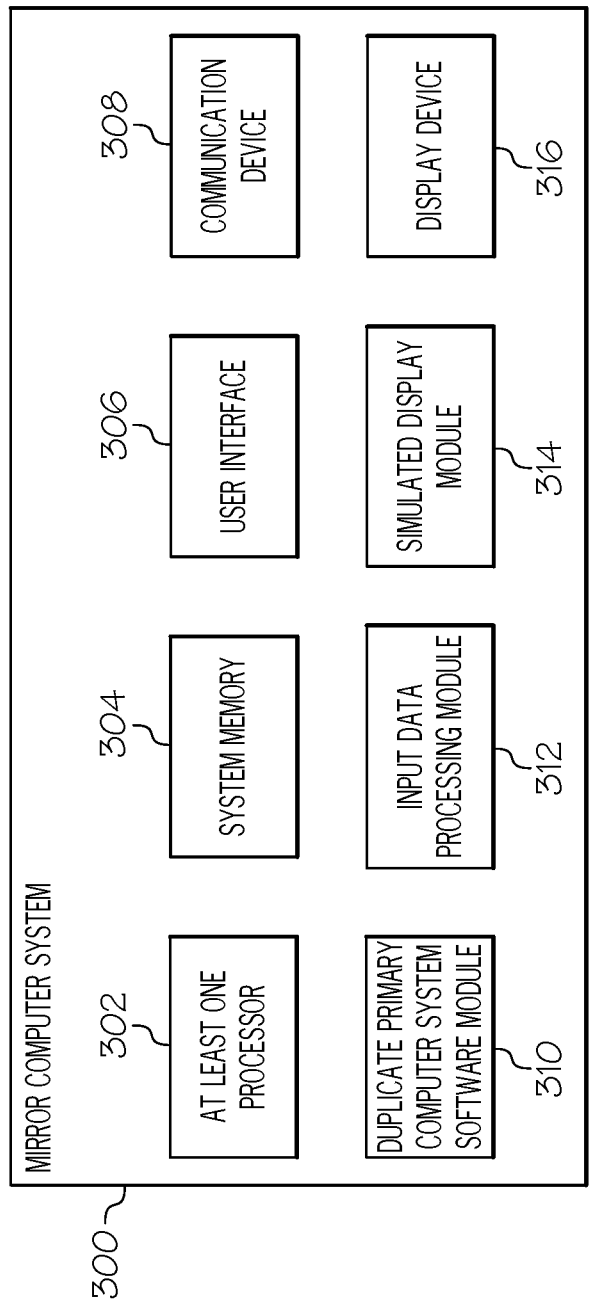
FIG. 3 is a functional block diagram of a mirror computer system, in accordance with the disclosed embodiments.

FIG. 3 is a functional block diagram of a mirror computer system 300, in accordance with the disclosed embodiments. It should be noted that the mirror computer system 300 can be implemented with the mirror computer system 104 depicted in FIG. 1. In this regard, the mirror computer system 300 shows certain elements and components of the mirror computer system 104 in more detail. As described previously with regard to FIG. 1, The mirror computer system 300 is operable to receive an instance of a set of data that is identical to a second instance of the same set of data received by the primary computer system (not shown), to process the data using a duplicate of software that is normally stored, maintained, and executed by the primary computer system, and produces an output result indicative of whether or not the set of data is uncorrupted and safe for use by the primary computer system.

The mirror computer system 300 generally includes, without limitation: at least one processor 302; system memory 304; a user interface 306; a communication device 308; a duplicate primary computer system software module 310; an input data processing module 312; a simulated display module 314; and a display device 316. The at least one processor 302, the system memory 304, the user interface 306, the communication device 308, and the display device 316 are similar in configuration and function to their counterpart items described above in the context of the primary computer system 200. Accordingly, common features and operations of these elements of the mirror computer system 300 will not be redundantly described here.

The duplicate primary computer system software module 310 is configured to store (via the system memory 304), maintain, and execute a duplicate of software associated with the primary computer system (not shown). The duplicate primary computer system software module 310 is thus configured to simulate operation of the primary computer system through execution of the duplicate and to create a "mirror" of the primary computer system which may be used to test and verify the integrity of a set of input data received from an external source without compromising the primary computer system.

The input data processing module 312 is configured to use the set of data received from an external source during the simulated operation of the primary computer system (via the duplicate primary computer system software module 310). More specifically, the input data processing module 312 processes the set of data, using the set of data as one or more input parameters to the duplicate of the primary computer system software, to produce one or more output results. In this way, the input data processing module 312 functions to test the integrity of the set of data using the mirror computer system 300 that is separate and distinct from the primary computer system, such that the primary computer system will not become corrupted when the set of incoming data is corrupted. In the case of a corrupt set of incoming data, first executing the duplicate software by the mirror computer system 300 protects the primary computer system by allowing the corrupt set of incoming data to be used by the mirror computer system 300 and the corrupt output results to be presented by the simulated display module 314 (via the display device 316).

The simulated display module 314 is configured to replicate a display, graphical user interface, or other presentation normally associated with the primary computer system, and to present output results generated by processing a set of input data using the duplicate of the software application associated with the primary computer system. The simulated display module 314 operates cooperatively with the user interface 306 and the display device 316 to present a set of output results generated by the input data processing module 312 and, in some embodiments, to receive user input indications that the output results are approved or not approved for further use.

In practice, the duplicate primary computer system software module 310, the input data processing module 312, and/or the simulated display module 314 may be implemented with (or cooperate with) the at least one processor 302 to perform at least some of the functions and operations described in more detail herein. In this regard, the duplicate primary computer system software module 310, the input data processing module 312, and/or the simulated display module 314 may be realized as suitably written processing logic, application program code, or the like.

Figure 4:
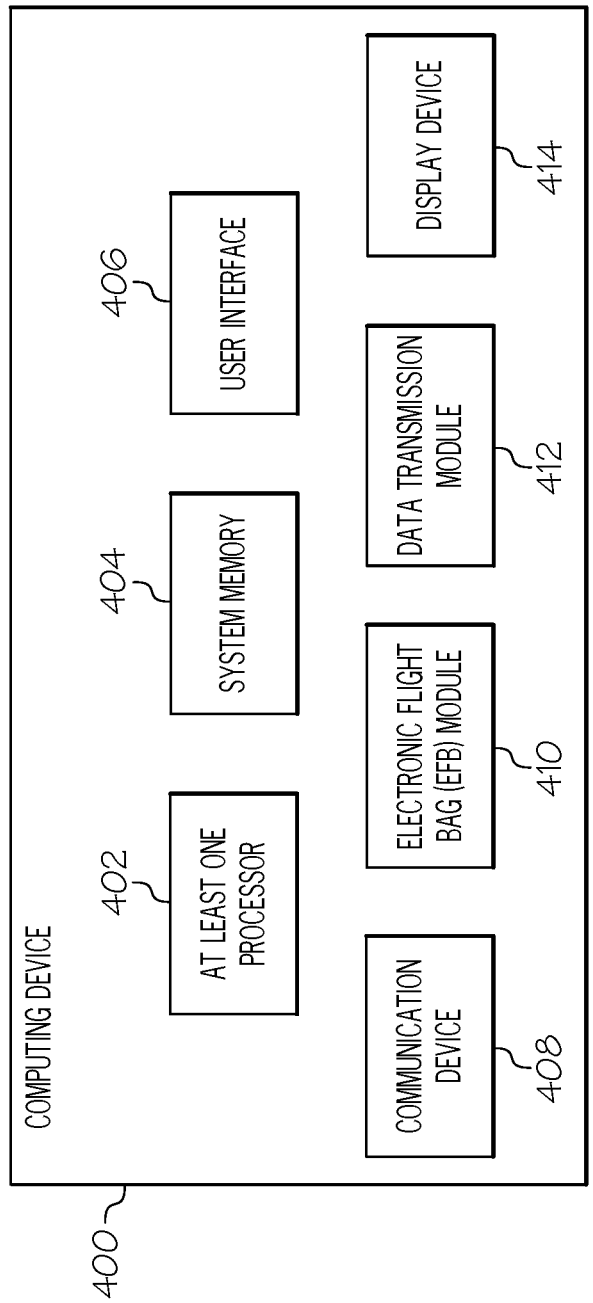
FIG. 4 is a functional block diagram of a computing device that provides incoming data for validation, in accordance with the disclosed embodiments.

FIG. 4 is a functional block diagram of a computing device 400 that provides incoming data for validation, in accordance with the disclosed embodiments. It should be noted that the computing device 400 can be implemented with the computing device 106 depicted in FIG. 1. In this regard, the computing device 400 shows certain elements and components of the computing device 106 in more detail. As described previously with regard to FIG. 1, the computing device 400 is operable to transmit a set of data to a primary computer system and a mirror computer system, simultaneously, such that the mirror computer system can test and verify the set of data before the primary computer system imports and uses the set of data. As described previously, the computing device 400 may be implemented as a personal computing device, a ground control computer system, or any other computer capable of communicating with the primary computer system and the mirror computer system. However, FIG. 4 illustrates one exemplary embodiment of the computing device 400 implemented by a personal computing device configured to perform functionality associated with aviation applications onboard an aircraft.

The computing device 400 generally includes, without limitation: at least one processor 402; system memory 404; a user interface 406; a communication device 408; an Electronic Flight Bag (EFB) module 410; a data transmission module 412; and a display device 414. The at least one processor 402, the system memory 404, the user interface 406, the communication device 408, and the display device 414 are similar in configuration and function to their counterpart items described above in the context of the primary computer system 200. Accordingly, common features and operations of these elements of the computing device 400 will not be redundantly described here.

The Electronic Flight Bag (EFB) module 410 is configured to store, maintain, and execute one or more EFB applications for use by the computing device 400. In the exemplary embodiment described herein, the EFB module 410 may be used to perform aviation tasks associated with integrated avionics systems onboard an aircraft. The EFB module 410 may execute an EFB application to establish communication connections to the aircraft onboard avionics systems and to cooperatively perform aviation tasks using the established communication connections. The EFB module 410 is further configured to present graphical elements and text associated with the EFB application, receive user input selections, commands, and data entry associated with the EFB application, and generate data associated with the EFB application.

The data transmission module 412 is configured to transmit a set of data, via the communication device 408, to a primary computer system and a mirror computer system, wherein the set of data is generated by the EFB module 410. Generally, the data transmission module 412 transmits a first instance of the set of data and a second instance of the set of data to both of the destination locations (e.g., the primary computer system and the mirror computer system) simultaneously, via the communication device 408. By transmitting the first and second instances of the set of data simultaneously, the data transmission module 412 ensures that the primary computer system and the mirror computer system receive identical sets of data such that the testing performed by the mirror computer system is accurate and reliable when verifying the uncorrupted and safe state of the set of data. Alternatively, the data transmission module 412 may transmit (e.g., broadcast) a single set of data that is received by both the primary computer system and the mirror computer system.

In practice, the EFB module 410 and/or the data transmission module 412 may be implemented with (or cooperate with) the at least one processor 402 to perform at least some of the functions and operations described in more detail herein. In this regard, the EFB module 410 and/or the data transmission module 412 may be realized as suitably written processing logic, application program code, or the like.

Figure 5:
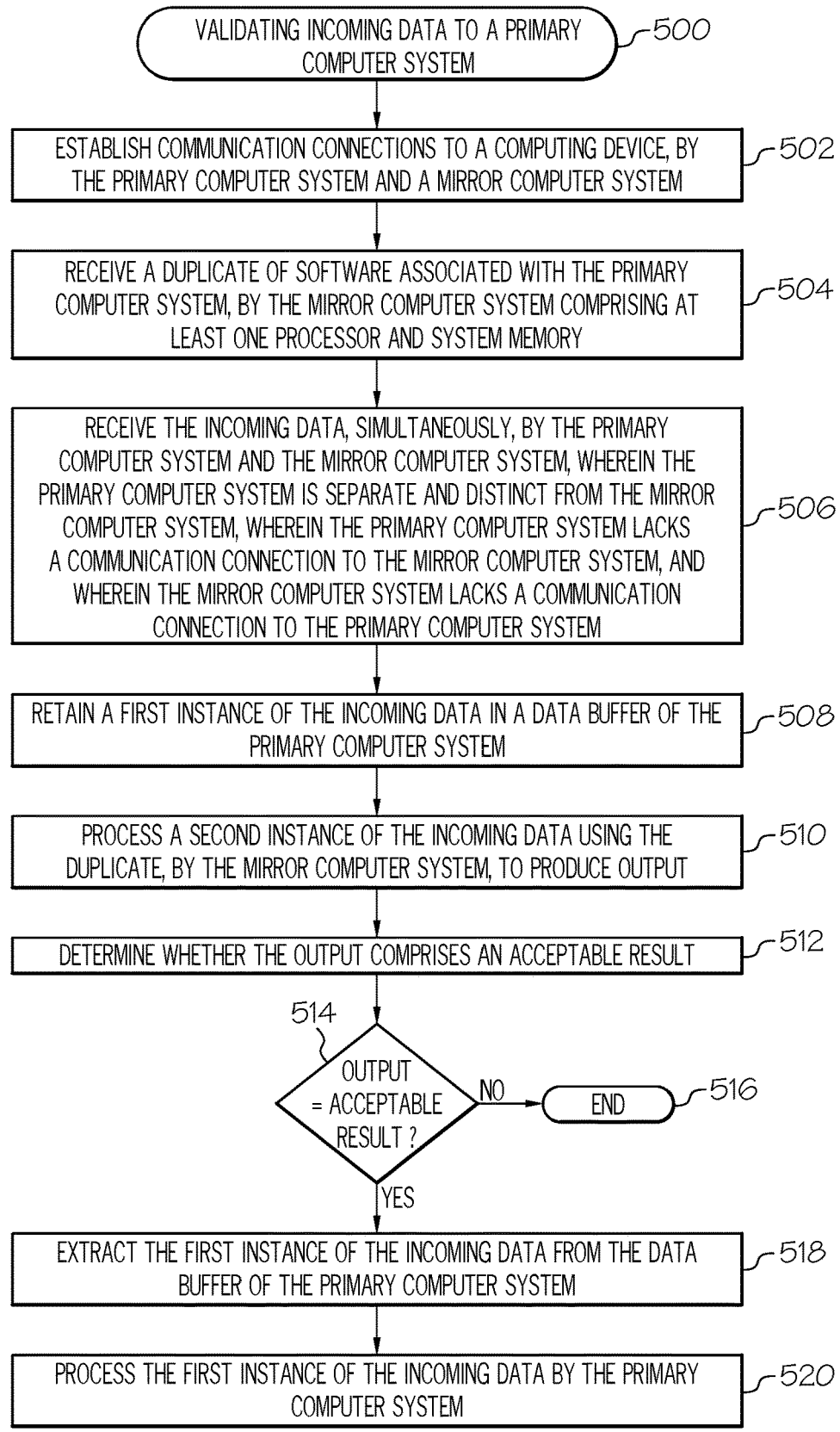
FIG. 5 is a flow chart that illustrates an embodiment of a process for validating incoming data to a primary computer system, in accordance with the disclosed embodiments.

FIG. 5 is a flow chart that illustrates an embodiment of a process 500 for validating incoming data to a primary computer system, in accordance with the disclosed embodiments. The process 500 is generally performed by a data verification and testing system that includes a primary computer system and a mirror computer system, such as that described previously with regard to FIGS. 1-3. In the described embodiment, the data verification system receives a new set of data (e.g., the incoming data), tests the data to ensure data integrity, and permits actual use of the data by the primary computer system after testing produces acceptable results. Testing is performed by the mirror computer system, such that the more secure primary computer system is protected from corrupt data.

First, the process 500 establishes communication connections to a computing device, by the primary computer system and a mirror computer system (step 502). The communication connections may be wireless, hardwired, or a combination of both. For example, the primary computer system may be connected to the computing device via a hardwired communication connection while the mirror computer system is connected to the computing device via a wireless communication connection. In other examples, both of the primary computer system and the mirror computer system are connected to the computing device via a wireless connection or via a hardwired connection.

The process 500 also receives a duplicate of software associated with the primary computer system, by the mirror computer system (step 504). Here, the mirror computer system receives a duplicate of the software used by the primary computer system, such that the mirror computer system performs functionality identical to the primary computer system. The mirror computer system then operates as a simulator of operations normally performed by the primary computer system, for data testing and verification purposes.

The process 500 receives the incoming data, simultaneously, by the primary computer system and the mirror computer system, wherein the primary computer system is separate and distinct from the mirror computer system, wherein the primary computer system lacks a communication connection to the mirror computer system, and wherein the mirror computer system lacks a communication connection to the primary computer system (step 506). The primary computer system and the mirror computer system do not have a communication connection between them, to protect the primary computer system from potentially unsafe or corrupt data transmitted by the computing device. The incoming data is received simultaneously by the primary computer system and the mirror computer system, from a single data transmission from the computing device, such that the primary computer system and the mirror computer system receive the same, identical set of data.

The process 500 retains a first instance of the incoming data in a data buffer of the primary computer system (step 508), while processing a second set of the incoming data using the duplicate, by the mirror computer system, to produce output (step 510). Here, the primary computer system has received the set of incoming data and holds the set of incoming data in a data buffer. The primary computer system performs no additional actions during processing of the set of incoming data by the mirror computer system. The mirror computer system includes a duplicate of the software associated with the primary computer system, and operates as a simulator for the primary computer system. As a simulator, the mirror computer system performs the same actions and executes the same functions that are usually performed and executed the primary computer system during normal operations. Acting as a simulator for the primary computer system, the mirror computer system is expected to produce the same output results expected from the primary computer system.

The process 500 then determines whether the output comprises an acceptable result (step 512). An acceptable result may include any presented output result that is confirmed by a user to be correct, accurate, expected, foreseeable, or otherwise satisfactory. Typically, the output is presented to the user, and the user views the presented output and provides either (1) a confirmation that the result is acceptable or (2) a rejection of the output result as unacceptable. The process 500 may request and receive user input via the mirror computer system, the primary computer system, or both. For example, the process 500 may present the output, via a display device communicatively coupled to the mirror computer system; receive first user input verifying validity of the output, via a first user interface communicatively coupled to the mirror computer system; and receive second user input permitting the incoming data for use by the computer system, via a second user interface communicatively coupled to the computer system. As another example, the process 500 may present the output, via a display device communicatively coupled to the mirror computer system; and receive user input verifying validity of the output and permitting the incoming data for use by the computer system, via a user interface communicatively coupled to the primary computer system.

When the output does not comprise an acceptable result (the "No" branch of 514), the process 500 ends (step 516), and the incoming data is never processed by the primary computer system. When the output does not comprise an acceptable result, the output may include any unexpected, erroneous, or corrupt result. The output indicates whether the set of incoming data is uncorrupted and safe for use in execution of program functionality by the primary computer system, and here the process 500 has determined that the set of incoming data is not acceptable, verified, or safe for the primary computer system to use during execution of one or more applications.

When the output comprises an acceptable result (the "Yes" branch of 514), the process 500 proceeds to permit use of the set of incoming data by the primary computer system during execution of one or more applications. When the output comprises an acceptable result, the output includes expected and accurate results, as indicated by the user input confirmation. The output presented to the user indicates whether the set of incoming data is uncorrupted and safe for use in execution of program functionality by the primary computer system, and here the process 500 has determined (based on a user input confirmation) that the set of incoming data is acceptable and safe for the primary computer system to use during execution of one or more applications. In response, the process 500 extracts the first instance of the incoming data from the data buffer of the primary computer system (step 518) and processes the first instance of the incoming data by the primary computer system (step 520). Thus, the process 500 permits the set of incoming data for actual use by the primary computer system, after testing and verification is performed through simulations of the mirror computer system.

Figure 6:
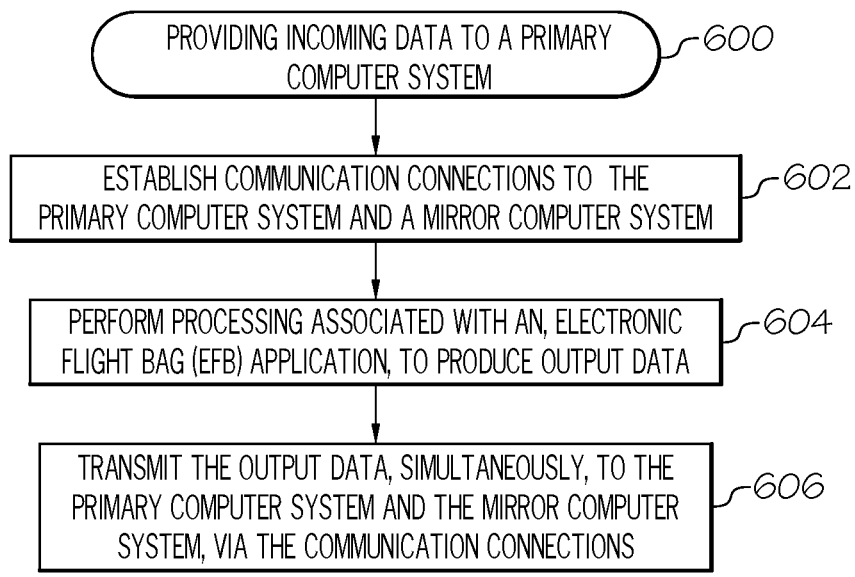
FIG. 6 is a flow chart that illustrates an embodiment of a process for providing incoming data to a primary computer system, in accordance with the disclosed embodiments.

FIG. 6 is a flow chart that illustrates an embodiment of a process 600 for providing incoming data to a primary computer system, in accordance with the disclosed embodiments. The process 600 is generally performed by a computing device using a communication protocol compatible with a primary computer system and a mirror computer system, such as that described previously with regard to FIGS. 1 and 4. In the described embodiment, the computing device is a personal computing device (e.g., a laptop computer, tablet computer) used onboard an aircraft to perform aviation tasks associated with aircraft onboard avionics systems using an Electronic Flight Bag (EFB) application.

First, the process 600 establishes communication connections to the primary computer system and a mirror computer system (step 602). The communication connections may be wireless, hardwired, or a combination of both. For example, the computing device may be connected to the primary computer system via a hardwired communication connection while the computing device is connected to the mirror computer system via a wireless communication connection. In other examples, both of the primary computer system and the mirror computer system are connected to the computing device via a wireless connection or via a hardwired connection.

Next, the process 600 performs processing associated with an Electronic Flight Bag (EFB) application, to produce output data (step 604). The computing device is configured to store, maintain, and execute one or more EFB applications to perform aviation tasks associated with one or more avionics systems onboard the aircraft. The process 600 may execute an EFB application to establish communication connections to the aircraft onboard avionics systems and to cooperatively perform aviation tasks using the established communication connections. The computing device presents graphical elements and text associated with the EFB application; receives user input selections, commands, and data entry associated with the EFB application; and generates output data associated with the EFB application.

The process 600 then transmits the output data, simultaneously, to the primary computer system and the mirror computer system, via the communication connections (step 606). The process 600 simultaneously transmits a first instance of the set of data to the primary computer system and a second instance of the set of data to the mirror computer system. By transmitting the first and second instances of the set of data simultaneously, the process 600 ensures that the primary computer system and the mirror computer system receive identical sets of incoming data such that the testing performed by the mirror computer system is accurate and reliable when verifying the uncorrupted and safe status of the set of incoming data. Alternatively, the process 600 may transmit (e.g., broadcast) a single set of data that is independently received by both the primary computer system and the mirror computer system.

The various tasks performed in connection with processes 500-600 may be performed by software, hardware, firmware, or any combination thereof. For illustrative purposes, the preceding descriptions of processes 500-600 may refer to elements mentioned above in connection with FIGS. 1-4. In practice, portions of processes 500-600 may be performed by different elements of the described system. It should be appreciated that processes 500-600 may include any number of additional or alternative tasks, the tasks shown in FIGS. 5-6 need not be performed in the illustrated order, and processes 500-600 may be incorporated into a more comprehensive procedure or process having additional functionality not described in detail herein. Moreover, one or more of the tasks shown in FIGS. 5-6 could be omitted from embodiments of the processes 500-600 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematics shown in FIGS. 2-4 depict exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for validating incoming data to a Flight Management System (FMS) onboard an aircraft, the method comprising:
   receiving the incoming data, simultaneously, by the FMS and a second avionics system onboard the aircraft, wherein the FMS is separate and distinct from the second avionics system, the FMS lacks a communication connection to the second avionics system, and the second avionics system lacks a communication connection to the FMS;
   processing the incoming data by the second avionics system, to produce output;
   presenting the output, via a display device communicatively coupled to the second avionics system;
   receiving first user input, via a first user interface communicatively coupled to the second avionics system, that indicates validity of the output has been verified;
   receiving second user input, via a second user interface communicatively coupled to the FMS, that permits the FMS to use the incoming data;
   processing the incoming data by the FMS, in response to the second user input;
   establishing communication connections to a computing device executing an Electronic Flight Bag (EFB) application, by the FMS and the second avionics system;
   receiving the incoming data via the communication connections, simultaneously, by a data buffer of the FMS and by the second avionics system;
   processing a first instance of the incoming data by the second avionics system; and
   extracting a second instance of the incoming data from the data buffer and processing the second instance by the FMS when the validity of the output has been verified.

2. The method of claim 1, further comprising:
   creating a duplicate of software associated with the FMS, wherein the duplicate is stored, maintained, and executed using the second avionics system comprising at least one processor and system memory;
   wherein processing the incoming data by the second avionics system is performed using the duplicate; and
   wherein execution of the duplicate by the second avionics system results in a simulation of operation of the computer system.

3. The method of claim 1, further comprising:
   establishing wireless communication connections to the computing device, by the FMS and the second avionics system;
   wherein the incoming data is received simultaneously by the FMS and the second avionics system, via the wireless communication connections.

4. The method of claim 1, further comprising:
   establishing hardwired communication connections to the computing device, by the FMS and the second avionics system;
   wherein the incoming data is received simultaneously by the FMS and the second avionics system, via the hardwired communication connections.

5. The method of claim 1, further comprising:
   after simultaneously receiving the incoming data by the FMS and the second avionics system,
      retaining the first instance of the incoming data in the data buffer, during processing of the second instance of the incoming data by the second avionics system; and
      extracting the first instance of the incoming data from the data buffer, in response to the second user input, by the FMS.

6. A system for validating incoming data, the system comprising:
   a mirror computer system, comprising:
      a mirror memory element;
      a mirror display device, configured to simulate a primary display device;
      a mirror communication device, configured to receive a first instance of incoming data at a particular time;
      a mirror processor, communicatively coupled to the mirror memory element, the mirror display device, and the mirror communication device, the mirror processor configured to:
         process the first instance of the incoming data, when received via the mirror communication device; and
         present output via the mirror display device, based on processing the first instance of the incoming data;
      a mirror user interface communicatively coupled to the mirror processor, the mirror user interface configured to receive first user input that indicates validity of the output has been verified; and
   a primary computer system, comprising:
      a primary memory element;
      a primary communication device, configured to receive a second instance of the incoming data at the particular time;
      a primary user interface configured to receive second user input that permits the primary computer system to process the second instance of the incoming data;
      a primary processor, communicatively coupled to the primary memory element, the primary user interface, and the primary communication device, the primary processor configured to process the second instance of the incoming data, in response to the second input,
      wherein the primary computer system comprises a Flight Management System (FMS) onboard an aircraft, the mirror computer system comprises a second avionics system onboard the aircraft, and the system further comprises a computing device executing an Electronic Flight Bag (EFB) application, the computing device having communication connections with the FMS and the second avionics system;
      and wherein:

a data buffer of the FMS and the second avionics system simultaneously receive the incoming data via the communication connections;

the second avionics system processes a first instance of the incoming data; and the FMS extracts a second instance of the incoming data from the data buffer and processes the second instance of the incoming data when the validity of the output has been verified.

7. The system of claim 6, wherein the mirror processor is further configured to:

receive a duplicate of software associated with the primary computer system, via the mirror communication device;

store the duplicate, via the mirror memory element; and process the first instance of the incoming data by executing the duplicate, using the first instance of the incoming data;

wherein execution of the duplicate results in a simulation of operation of the primary computer system.

8. The system of claim 6, wherein the data buffer is configured to retain the second instance of the incoming data during processing of the first instance of the incoming data by the second avionics system; and wherein the primary processor is further configured to extract the second instance from the data buffer to process the second instance, in response to the second input.

9. The system of claim 6, wherein the primary computer system and the mirror computer system are further configured to:

establish wireless communication connections to the computing device; and receive the incoming data, simultaneously, via the wireless communication connections, wherein the incoming data is received as a broadcast transmitted by the computing device via the wireless communication connections.

10. The system of claim 6, wherein the primary computer system and the mirror computer system are further configured to:

establish hardwired communication connections to the computing device; and receive the incoming data, simultaneously, via the hardwired communication connections, wherein the incoming data is received as a broadcast transmitted by the computing device via the hardwired communication connections.

11. A method for receiving and processing incoming data by a system comprising at least a primary computer system and a mirror computer system, the method comprising:

obtaining a duplicate of software associated with the primary computer system, by the mirror computer system;

receiving the incoming data, simultaneously, by the primary computer system and a mirror computer system, wherein the primary computer system is separate and distinct from the mirror computer system, wherein the primary computer system lacks a communication connection to the mirror computer system, and wherein the mirror computer system lacks a communication connection to the primary computer system;

processing the incoming data by executing the duplicate, by the mirror computer system, to produce output, wherein execution of the duplicate results in a simulation of operation of the primary computer system;

presenting the output, via a display device communicatively coupled to the mirror computer system;

receiving first user input, via a first user interface communicatively coupled to the mirror computer system, that indicates validity of the output has been verified;

receiving second user input, via a second user interface communicatively coupled to the computer system, that permits the computer system to use the incoming data; and processing the incoming data by the primary computer system, in response to the second user input, wherein the primary computer system comprises a Flight Management System (FMS) onboard an aircraft;

wherein the mirror computer system comprises a second avionics system onboard the aircraft; and wherein the method further comprises:

establishing communication connections to a computing device executing an Electronic Flight Bag (EFB) application, by the FMS and the second avionics system;

receiving the incoming data via the communication connections, simultaneously, by a data buffer of the FMS and by the second avionics system;

processing a first instance of the incoming data by the second avionics system; and extracting a second instance of the incoming data from the data buffer and processing the second instance by the FMS when the validity of the output has been verified.

12. The method of claim 11, further comprising:

after simultaneously receiving the incoming data by the primary computer system and the mirror computer system, retaining a first instance of the incoming data in a data buffer that is part of the primary computer system, during processing of a second instance of the incoming data by the mirror computer system; and extracting the first instance from the data buffer to process the first instance by the primary computer system in response to the second user input.

* * * * *